(12) United States Patent
Skestone et al.

(10) Patent No.: US 11,143,071 B2
(45) Date of Patent: Oct. 12, 2021

(54) HYBRID ACOUSTIC SILENCER

(71) Applicant: Cascade Engineering, Inc., Grand Rapids, MI (US)

(72) Inventors: Andrew Skestone, Caledonia, MI (US); Michael Thomas Campbell, Grand Rapids, MI (US)

(73) Assignee: Cascade Engineering, Inc., Grand Rapids, MI (US)

( * ) Notice: Subject to any disclaimer, the term of this patent is extended or adjusted under 35 U.S.C. 154(b) by 342 days.

(21) Appl. No.: 16/388,995

(22) Filed: Apr. 19, 2019

(65) Prior Publication Data
US 2020/0332688 A1 Oct. 22, 2020

(51) Int. Cl.
*F01N 1/24* (2006.01)
*B32B 5/26* (2006.01)
*B32B 5/06* (2006.01)
*B60R 13/08* (2006.01)

(52) U.S. Cl.
CPC .............. *F01N 1/24* (2013.01); *B32B 5/06* (2013.01); *B32B 5/26* (2013.01); *B60R 13/0815* (2013.01)

(58) Field of Classification Search
None
See application file for complete search history.

(56) References Cited

U.S. PATENT DOCUMENTS

| | | | |
|---|---|---|---|
| 5,009,043 A | 4/1991 | Kurrasch | |
| 6,720,068 B1 | 4/2004 | Vanbemmel et al. | |
| 7,070,848 B2 | 7/2006 | Campbell | |
| 7,677,358 B2 | 3/2010 | Tocchi et al. | |
| 8,256,572 B2 | 9/2012 | Castagnetti et al. | |
| 8,261,876 B2 | 9/2012 | Castagnetti et al. | |
| 8,636,105 B2 | 1/2014 | Castagnetti et al. | |
| 8,636,106 B2 | 1/2014 | Castagnetti et al. | |
| 8,863,897 B2 | 10/2014 | Bertolini et al. | |
| 2003/0066708 A1 | 4/2003 | Allison et al. | |
| 2004/0231914 A1 | 11/2004 | Thompson, Jr. et al. | |
| 2008/0073146 A1 | 3/2008 | Thompson et al. | |
| 2008/0083279 A1 | 4/2008 | Albin | |
| 2011/0253474 A1 | 10/2011 | Castagnetti et al. | |
| 2011/0254307 A1 | 10/2011 | Castagnetti et al. | |
| 2013/0056301 A1 | 3/2013 | Castagnetti et al. | |
| 2013/0062142 A1 | 3/2013 | Castagnetti et al. | |
| 2014/0014438 A1 | 1/2014 | Bertolini et al. | |
| 2014/0265413 A1 | 9/2014 | Demo et al. | |
| 2017/0372688 A1 | 12/2017 | Bush et al. | |

FOREIGN PATENT DOCUMENTS

RU 186830 U1 2/2019

OTHER PUBLICATIONS

International Search Report and Written Opinion of International Application No. PCT/US20/16929, dated Apr. 29, 2020.

*Primary Examiner* — Alexander S Thomas
(74) *Attorney, Agent, or Firm* — Warner Norcross + Judd LLP

(57) ABSTRACT

A hybrid acoustic silencer for a motor vehicle includes an insertion loss layer tuned for good insertion loss properties at specific frequencies and an absorption layer tuned for good absorption properties at specific frequencies. The insertion loss layer is configured to be adjacent to a sound radiating surface of the motor vehicle and the absorption layer is configured to face outward from the sound radiating surface of the motor vehicle.

19 Claims, 10 Drawing Sheets

HYBRID ACOUSTIC SILENCER

BACKGROUND OF THE INVENTION

The present invention relates to acoustic silencers for vehicles, also known as acoustic insulators, sound insulators, dash silencers, dash mats, or dash insulators.

In most contemporary vehicles, it is common practice to position an acoustic silencer adjacent a body panel, such as a steel firewall separating the engine compartment from the passenger compartment, to provide sound insulation and provide the vehicle with good acoustics. The acoustic silencer reduces the transmission of sound and vibrations from the engine compartment to the passenger compartment through the dash panel. Typical vehicle acoustic silencers include a noise barrier panel made of self-supporting, thermoset and/or thermoplastic materials and an acoustic absorber that typically includes a fibrous mat or foam panel. The acoustic absorber is fixed to the barrier panel to provide a sound insulating system that can be installed as a unitary assembly.

In recent years, acoustic silencers that are dissipative, that is, made with all fiber layers, have become common due to being lighter weight than traditional mass-spring designs that use a heavy barrier of air-impervious or substantially air-impervious material. Airflow resistant scrims are sometimes used. While these silencers provide some absorption, the main effort in the industry has been to improve the insertion loss properties of dissipative acoustic silencers.

FIGS. 1 and 2 show a typical range of acoustic properties that these prior art compression molded fiber silencers are capable of providing. Three samples of prior art compression molded fiber silencers that are currently in production, referred to herein as Sample X, Sample Y, and Sample Z, were compared. To have a direct comparison, a thickness of 15 mm was used for all samples.

Sample X is a compression molded silencer made of two layers of cotton shoddy with a surface density of 2.19 kg/m$^2$ and with an airflow resistance of 1580 mks rayls measured using ASTM C522.

Sample Y is a compression molded silencer made of two layers of cotton shoddy with a surface density of 2.81 kg/m$^2$ and with an airflow resistance of 2470 mks rayls measured using ASTM C522.

Sample Z is a compression molded silencer made of two layers of cotton shoddy with a surface density of 2.68 kg/m$^2$ and with an airflow resistance of 7000 mks rayls measured using ASTM C522.

Samples X-Z are dual layer silencers, with a thinner, higher density layer on top of a lower density fiber layer which is lighter, but still heavy. To form these silencers, the two layers are molded into shape while being compressed. This process restricts the ability to use lighter layers in the constructions and still provide shape.

FIG. 1 shows the average performance in flat panel insertion loss of Samples X-Z as measured using a modified test based on SAE J1400. Insertion loss properties of acoustic silencers can be quantified by flat panel insertion loss testing on a steel panel. This test is intended to represent the sound transmission through the front of dash of a motor vehicle by using a steel panel having a thickness of 0.9 mm (SAE J1400 uses a limp lead panel). The insertion loss shown in FIG. 1 is the transmission loss of the system constituted by the sample part and the steel panel on which it is applied minus the transmission loss of the steel panel itself, averaged across a test frequency range of 315-5000 Hz.

Sample X, with the lowest surface density and airflow resistance, has an average insertion loss performance. By increasing the fiber density and airflow resistance, overall insertion loss performance can be improved as can be seen in Sample Y and Sample Z. Sample Y has a higher fiber density, which also increases the airflow resistivity. Sample Z has an even higher overall airflow resistance and shows the best insertion loss.

FIG. 2 shows the sound absorption for the prior art compression molded fiber silencers as measured using ASTM E1050. As noted above, in order to improve flat panel insertion loss, increased fiber density and/or airflow resistance are properties of Sample Y and Sample Z, but not Sample X. The effect of this is a reduction in absorption. This reduction is considered a good trade-off, because absorption properties are usually considered a secondary benefit to the insertion loss properties of front of dash acoustic silencers, and any absorption provided by front of dash acoustic silencers is considered to be an addition to the other passenger compartment absorptive components, i.e. carpet, headliners, and seats.

A challenge is presented when attempting to improve both insertion loss and sound absorption properties while providing a lighter weight acoustic silencer.

SUMMARY OF THE INVENTION

The aforementioned challenges are overcome by a hybrid acoustic silencer of the present invention.

In one embodiment, the acoustic silencer includes a first insertion loss layer configured to be adjacent to a sound radiating surface of a motor vehicle and a second absorption layer on the first layer and configured to face outward from the sound radiating surface of the motor vehicle. The layers are tuned to work complimentarily to provide overall better noise reduction while still providing a lightweight acoustic silencer.

In another embodiment, the first insertion loss layer can include a fiber decoupler layer and a first airflow resistant scrim attached to the fiber decoupler layer. The second absorption layer can include a fiber absorber layer on the first airflow resistant scrim and a second airflow resistant scrim attached to the fiber absorber layer.

In certain embodiments, the fiber decoupler layer has a surface density of about 0.6 to 1.3 kg/m$^2$ and a thickness of about 10-20 mm, and the first airflow resistant scrim has an airflow resistance about 1200 to 8000 mks rayls, measured using ASTM C522 and a thickness of about 0.1-1.0 mm.

In certain embodiments, the fiber absorber layer has a surface density of about 0.3 to 0.5 kg/m$^2$ and a thickness of about 6 mm, and the second airflow resistant scrim has an airflow resistance about 100 to 3000 mks rayls, measured using ASTM C522 and a thickness of about 0.1-1.0 mm.

These and other features and advantages of the invention will be more fully understood and appreciated by reference to the entire application including the specification, claims, and drawings.

DETAILED DESCRIPTION

Figure 1:
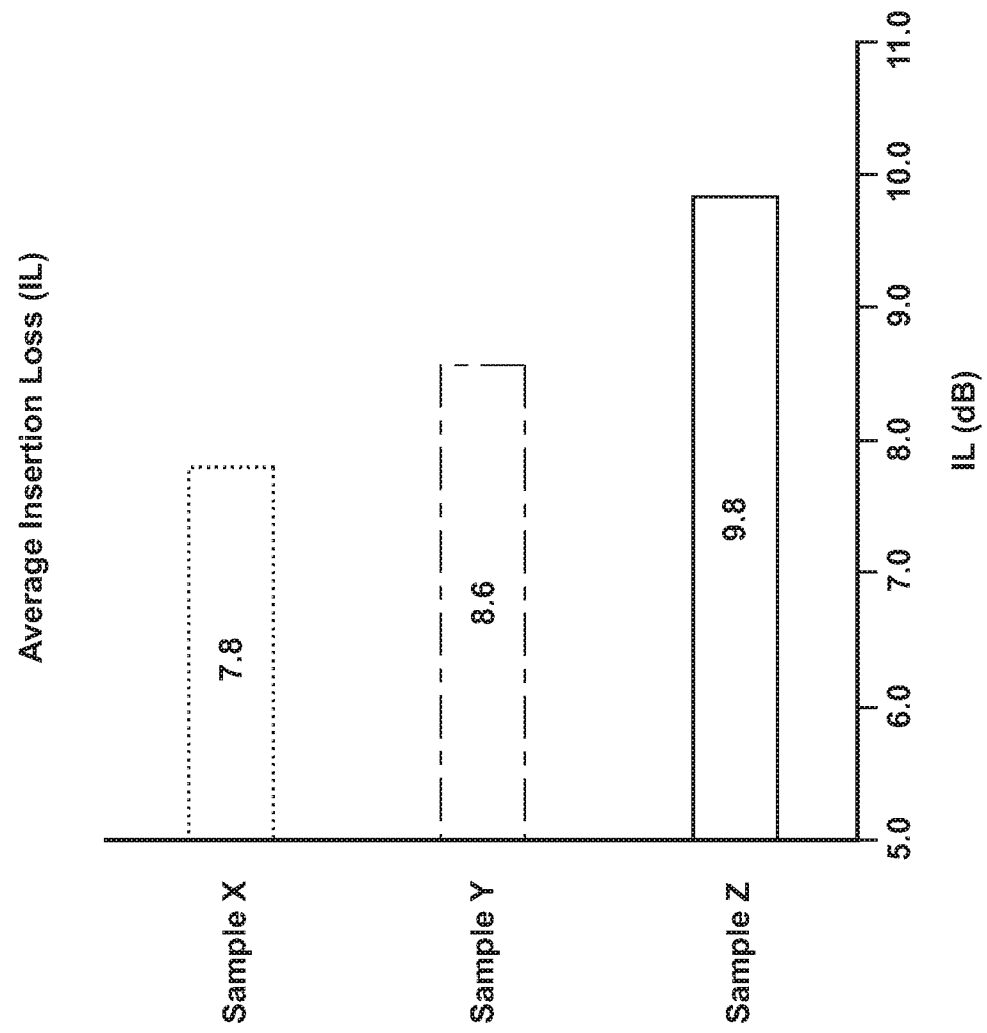
FIG. 1 is a graphical representation of the overall performance in flat panel insertion loss for three conventional acoustic silencers.
Figure 2:
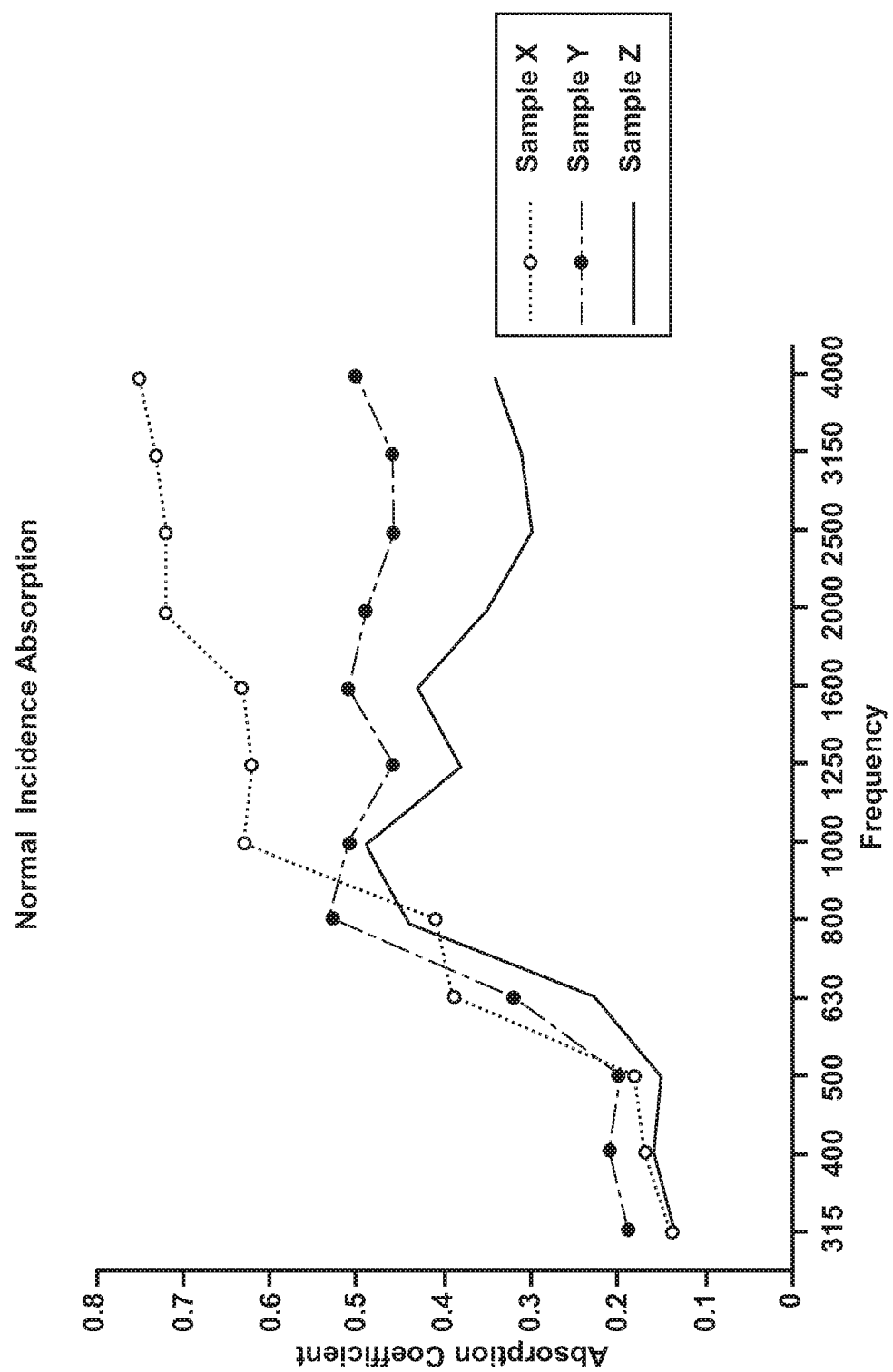
FIG. 2 is a graphical representation of the normal incidence absorption for three conventional acoustic silencers.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and may be practiced or carried out in alternative ways not expressly disclosed herein. In addition, it is to be understood that the phraseology and terminology used herein are for the purpose of description and should not be regarded as limiting. The use of "having," "including," and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

Figure 3:
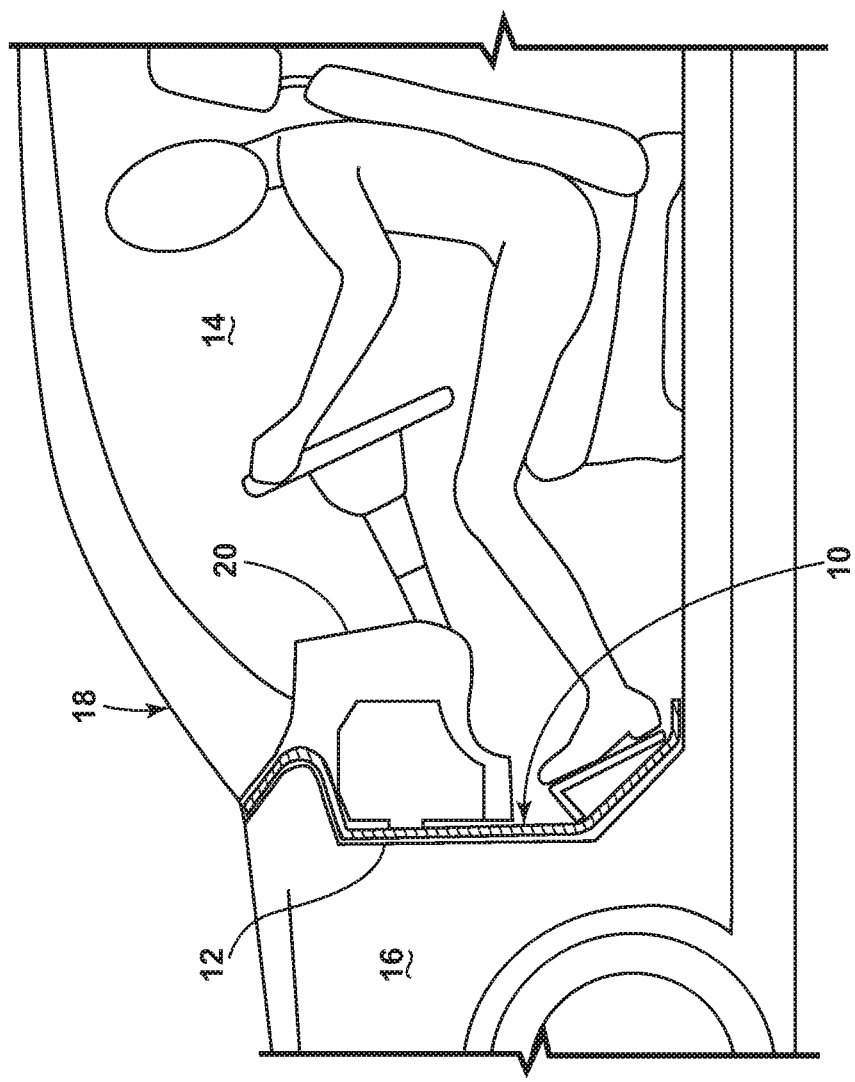
FIG. 3 is a schematic view of a portion of a motor vehicle having an acoustic silencer according to a first embodiment of the invention.

Referring now to the drawings and to FIG. 3 in particular, an acoustic silencer 10 according to a first embodiment of the invention is positioned on a firewall 12 separating a passenger compartment 14 and an engine compartment 16 of a motor vehicle 18. The firewall 12 separates the passenger compartment 14 from the engine compartment 16 in a generally well-known manner. A typical firewall is an irregularly shaped panel including holes or cutouts for electrical and mechanical control lines, steering mechanisms, heating and cooling conduits, and the like. The sound penetrating a firewall can be dependent upon variables such as the shape and thickness of the firewall, the number and location of cutouts, and the proximity of sound sources to the firewall. The physical configuration of the acoustic silencer 10 can take into account such varying factors.

The acoustic silencer 10 overlays the firewall 12 and optionally a portion of the floor. The acoustic silencer 10 is generally located immediately adjacent the firewall 12. Alternatively, an air gap can be provided between the acoustic silencer 10 and the firewall 12. Positioned as shown herein at a dashboard 20 of the motor vehicle 18, the acoustic silencer 10 forms a dash silencer, dash mat, or dash insulator. However, the acoustic silencer 10 can take on other forms, such as, for example, an acoustic door panel, rear wheelhouse liner, or vehicle roof panel, and can be attached to respective supporting substrates for these panels.

Figure 4:
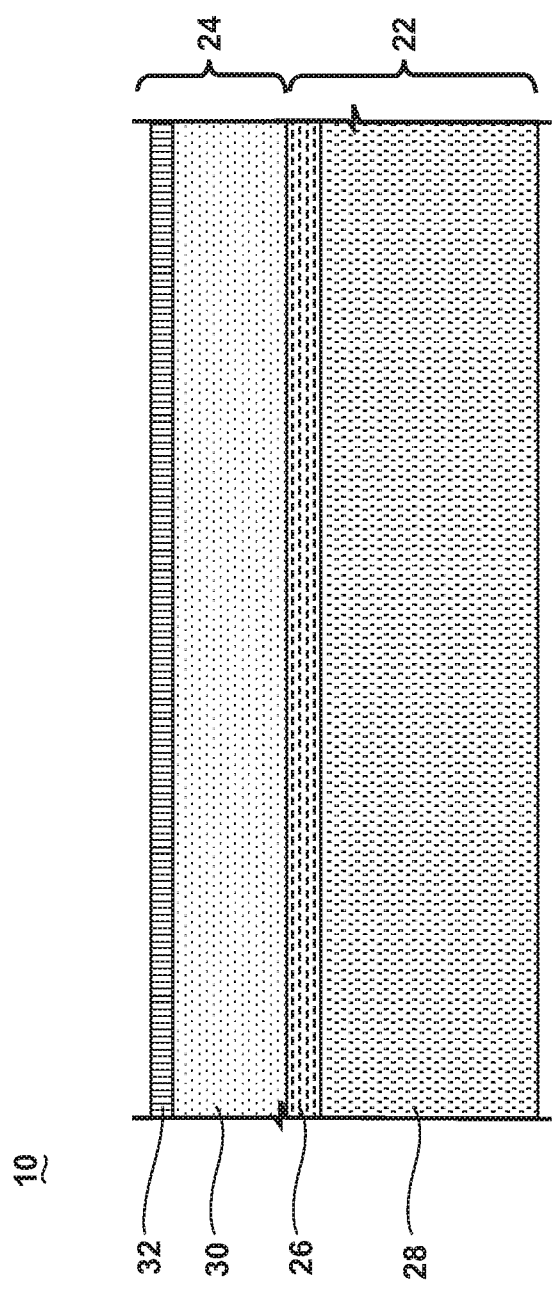
FIG. 4 is a cross-sectional view of a portion of the acoustic silencer of FIG. 3.

Referring to FIG. 4, the acoustic silencer 10 includes a dual-layer construction, and can include a first layer 22 tuned for insertion loss properties and a second layer 24 tuned for absorption properties. The first layer 22, also referred to herein as the bottom layer, is made of a first airflow resistant scrim 26 attached to a fiber decoupler layer 28. The first layer 22 is configured to lie adjacent to a sound radiating surface of a motor vehicle, such as the firewall 12 shown in FIG. 3. The second layer 24, also referred to herein as the top layer, is on the opposite side or on top of the first layer 22, and is configured to face outward from the sound radiating surface. The second layer 24 is made of a fiber absorber layer 30 with a second airflow resistant scrim 32. As used herein, a scrim is a thin nonwoven layer with a thickness between 0.1 and around 1 mm and an airflow resistance of between 100 and 8000 mks rayls measured using ASTM C522. The acoustic silencer 10 can further include additional fiber layers not illustrated herein.

The first and second layers 22, 24 can each be provided at a selected thickness determined to meet the sound absorption and insertion loss requirements of the motor vehicle. The thickness of the second layer 24 is usually ⅓ to ⅕ that of the first layer 22. In one example, the second layer 24 can be around 5 mm in thickness, and the first layer can be around 10-25 mm in thickness.

The first layer 22 is configured to primarily provide insertion loss and is preferably disposed in the vehicle adjacent the firewall 12, although an air gap may be included between the first layer 22 and the firewall 12. The particular materials and thickness of the first layer 22 are selected to provide desired insertion loss properties, such as good insertion loss for noise with frequencies at and above around 2000 Hz. This can be accomplished with the high airflow resistant scrim 26. The scrim 26 can be attached in any suitable manner to the decoupler layer 28.

The decoupler layer 28 can have a surface density of about 0.6 to 1.3 $kg/m^2$, alternatively of about 0.8 $kg/m^2$. The decoupler layer 28 is generally as light as is feasible, since lower frequency insertion loss is not critical to the silencer function. To balance this, the thickness of the decoupler layer 28 should be as thick as possible to maximize noise attenuation, and generally is about 10-20 mm, dependent on the spacing available in the front of dash assembly.

The high airflow resistant scrim 26 can have an airflow resistance of about 1200 to 8000 mks rayls, alternatively of about 3500 mks rayls, measured using ASTM C522, and thickness between 0.1 and around 1 mm.

The second layer 24 is configured to primarily provide sound absorption, and is preferably disposed between the first layer 22 and the passenger compartment 14 (FIG. 3). The particular materials and thickness of the second layer 24 are selected to provide desired sound absorption properties, such as good absorption in the noise frequency range of approximately 400 to 1600 Hz. This can be accomplished with a fiber absorber layer 30 that has a low density, such as a density of about 33 to about 200 kg/m$^3$, alternatively of about 66 kg/m$^3$.

The absorber layer 30 can have a surface density that is less than the surface density of the decoupler layer 28. For example, the absorber layer 30 can have a surface density of about 0.3 to 0.5 kg/m$^2$, alternatively of about 0.32 kg/m$^2$, and a thickness of about 6 mm. The top scrim 32 can have an airflow resistance of about 100 to 3000 mks rayls, alternatively of about 300 mks rayls, measured using ASTM C522, and thickness between 0.1 and around 1 mm. The scrim 32 can be attached in any suitable manner to the absorber layer 30.

The scrims 26, 32 can be any thin nonwoven material available that has the properties described herein. Some non-limiting examples include micro-cavitated (MC) polyester, polypropylene, or other plastic fabrics and/or films that are commonly used in acoustic insulator assemblies, including combinations thereof.

The decoupler and absorber layers 28, 30 can be any fiber or foam available that has the properties described herein. Generally, a blended recycled cotton shoddy layer is the most cost effective, however fibrous batting or mats made of polypropylene, polyester, polyethylene terephthalate (PET), combinations thereof, or other insulating materials that are commonly employed as sound absorbers in acoustic insulator assemblies can also be used.

In one example, the decoupler and absorber layers 28, 30 are made from cotton shoddy comprising a fiber mat made from various recycled fibers obtained from different sources. These fibers are blended with a low melt temperature bi-component polyester fiber. More specifically, the decoupler layer 28 is made from cotton shoddy having a surface density of about 0.8 kg/m$^2$ and the absorber layer 30 is made from cotton shoddy having a surface density of about 0.32 kg/m$^2$.

To make the second or top layer 24 as light as possible with current manufacturing methods, the top layer 24 can be die-cut since molding will compresses the layer more than is desirable for good absorption. The first or bottom layer 22 can be molded or die-cut. If the bottom layer 22 is molded, then the die-cut top layer 24 is bonded to the bottom layer 22 after molding. This is because the light top layer 24 is too delicate to withstand the shaping of the molding operation. If the bottom layer 22 is die-cut, then a molded frame or other shaping method is required to give the acoustic silencer 10 enough shape for assembly into the vehicle. A molded frame has the advantage of allowing for a mass barrier treatment to be added locally where hot spots of sound propagation occur. An example of the acoustic silencer 10 with a molded frame is described below with reference to FIGS. 5-6

Figure 5:
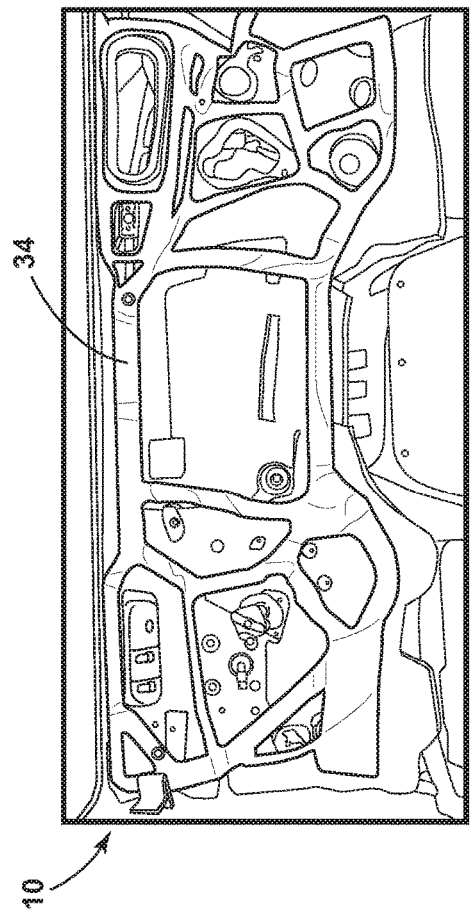
FIG. 5 is a perspective view of the acoustic silencer installed in a motor vehicle with a frame used to shape the acoustic silencer.

FIG. 5 shows an example of the acoustic silencer 10 installed in a motor vehicle before pass through components are assembled. In this example, the acoustic silencer 10 includes a molded frame 34 used to shape the fibrous layers 22, 24 of the acoustic silencer 10 to the dashboard of the motor vehicle.

Figure 6:
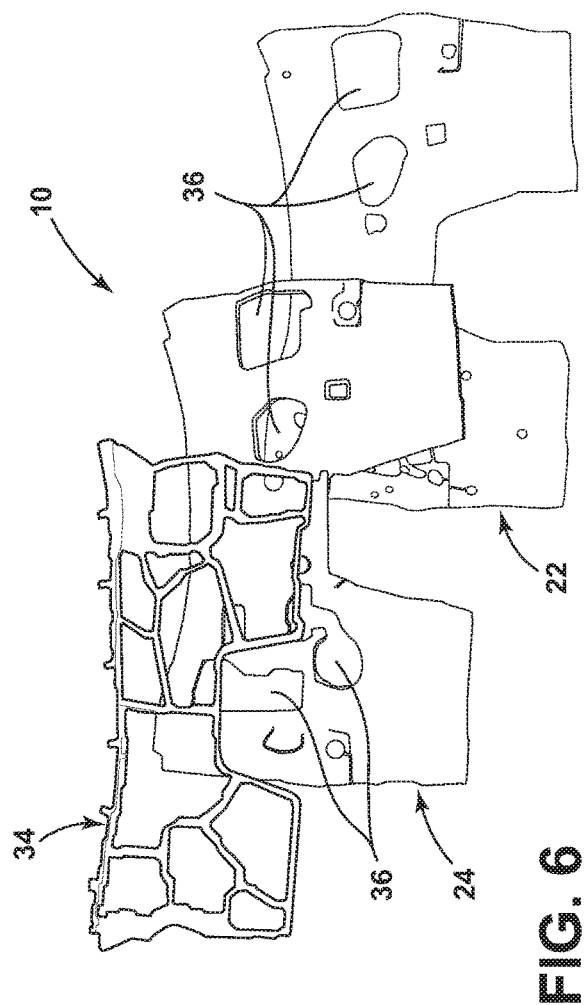
FIG. 6 is an exploded view of the acoustic silencer and frame from FIG. 5.

Referring additionally to FIG. 6, the acoustic silencer 10 can be an irregularly-shaped panel including the frame 34 and the fibrous layers 22, 24. The acoustic silencer 10 can be provided with a plurality of cutouts 36 for the passage of operational components between the engine compartment and the passenger compartment of the motor vehicle, such as a steering column cutout for passage of the steering column and a climate control line cutout for passage of the climate control lines, etc. The cutouts 36 are cooperatively aligned with openings in the firewall or the floor to which the acoustic silencer 10 is mounted. The fibrous layers 22, 24 can be molded or die-cut to form the cutouts 36.

The frame 34 is an irregularly-shaped structure configured to provide both structural support and three-dimensional shape for the fibrous layers 22, 24. The layers 22, 24 can be secured to the frame 34 because these layers 22, 24 are not rigid enough on their own to hold a three-dimensional shape. The three-dimensional shape of the frame 34 is designed to provide the proper offset and/or contact of the acoustic silencer 10 within the space adjacent the firewall. The layers 22, 24 may be secured to the frame 34 with adhesives and/or mechanical fasteners. Optionally, portions of the frame 34 can form barriers that provide sound obstruction for areas where vehicle noise transmission levels are high and additional sound obstruction is needed.

The frame 34 is lightweight yet sufficiently rigid to maintain the integrity of the acoustic silencer 10 during handling, shipping, and installation into the vehicle. Interior cross-members provide additional support to help achieve the desired shape and structural rigidity. The frame 34 can be injection molded or formed using any other suitable manufacturing method. One non-limiting example of a suitable frame is disclosed in more detail in U.S. Pat. No. 7,070,848, issued Jul. 4, 2006, which is incorporated herein by reference in its entirety.

In a conventional mass-spring silencer, the mass will reflect the sound back into the spring layer that is usually an absorber that fills the air space and reduces resonances through absorption. Lighter, low-density absorbers work effectively if coupled with a heavy barrier of air-impervious or substantially air-impervious material. If a lighter weight silencer is desired, the mass layer must be adjusted. However, without enough mass in either the mass layer or the spring layer, performance becomes very poor. Conventional dissipative silencers also use mass by increasing fiber surface density to increase insertion loss. The acoustic silencer 10 uses the high AFR scrim, rather than a barrier or fiber surface density, which results in improvement in the insertion loss at high frequencies. However, without a mass layer, the insertion loss at lower frequencies is reduced. Each layer 22, 24 can be tuned to focus performance on particular frequencies or range of frequencies.

Figure 7:
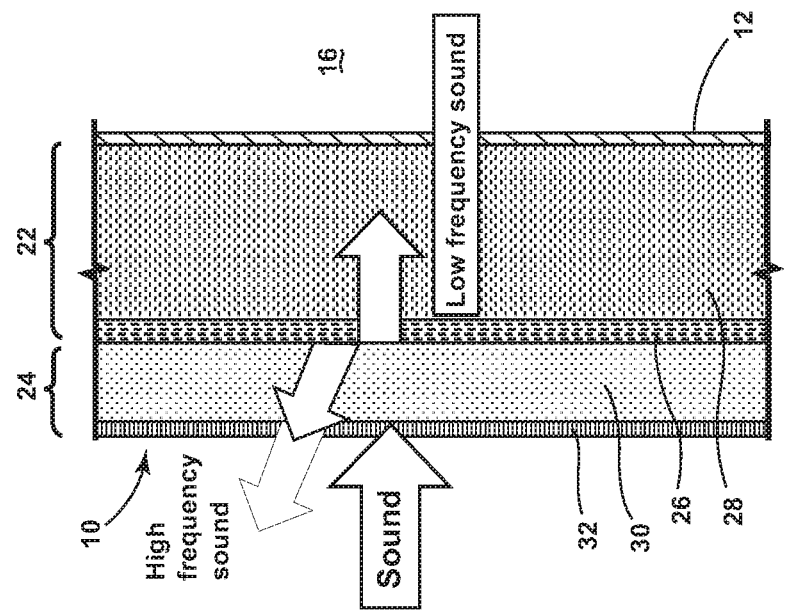
FIG. 7 is a schematic illustration of the insertion loss sound path for the acoustic silencer of FIG. 3.

FIG. 7 schematically illustrates the insertion loss sound path from the engine compartment 16 through the acoustic silencer 10. The majority of the insertion loss performance of the acoustic silencer 10 is due to the first layer 22, but is assisted by the absorbing second or top layer 24. The high airflow resistivity scrim 26 provides good high frequency insertion loss despite the low-density decoupler layer 28, but this construction has a low performance for noise with frequencies below about 2000 Hz, particularly from about 630 to 1000 Hz. In order to provide a good overall noise reduction in the motor vehicle, the second layer 24 attenuates noise at these frequencies.

Figure 8:
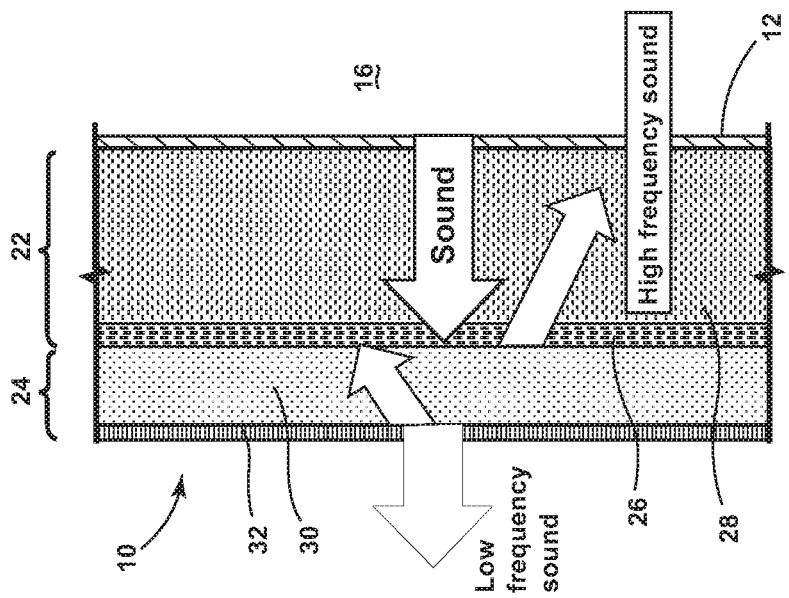
FIG. 8 is a schematic illustration of the absorption sound path for the acoustic silencer of FIG. 3.

FIG. 8 schematically illustrates the absorption sound path for the acoustic silencer 10. The second layer 24 provides significant improvement noise attenuation in the 630 to 1200 Hz range. The absorption is tuned by adding the airflow resistant scrim 32 to the lightweight top absorber layer 30.

For absorption, the first layer 22 assists the second layer 24 since the sound is within the absorber layer 30 when reaching the high airflow resistant scrim 26, thus reducing the reflection that would occur without the absorber layer 30. By using a porous, but high airflow resistant scrim 26 on the first layer 22, the sound waves reflected back into the acoustic silencer 10 will not as easily reflect off the high airflow resistant scrim 26 as they are impeded by the absorptive layer 24. The decoupler layer 28 will further absorb the low frequency sound waves.

The sound absorption and insertion loss performance of the acoustic silencer 10 were measured against a typical compression molded dual density fiber silencer of the prior art. Sample A is a typical compression molded dissipative silencer made of two layers of cotton shoddy with a total surface density of 2.19 kg/m$^2$ and a total airflow resistance of 1580 mks rayls measured using ASTM C522, and has an overall thickness of 15 mm. Sample B is the acoustic silencer 10 having a first or bottom layer including a die-cut cotton shoddy layer with a surface density of 0.80 kg/m$^2$ and an attached scrim that has an airflow resistance of 3000 mks rayls measured using ASTM C522, and a second or top layer including a die-cut cotton shoddy layer with a surface density of 0.40 kg/m$^2$ and an attached scrim that has an airflow resistance of 800 mks rayls measured using ASTM C522, and has an overall thickness of 15 mm.

Figure 9:
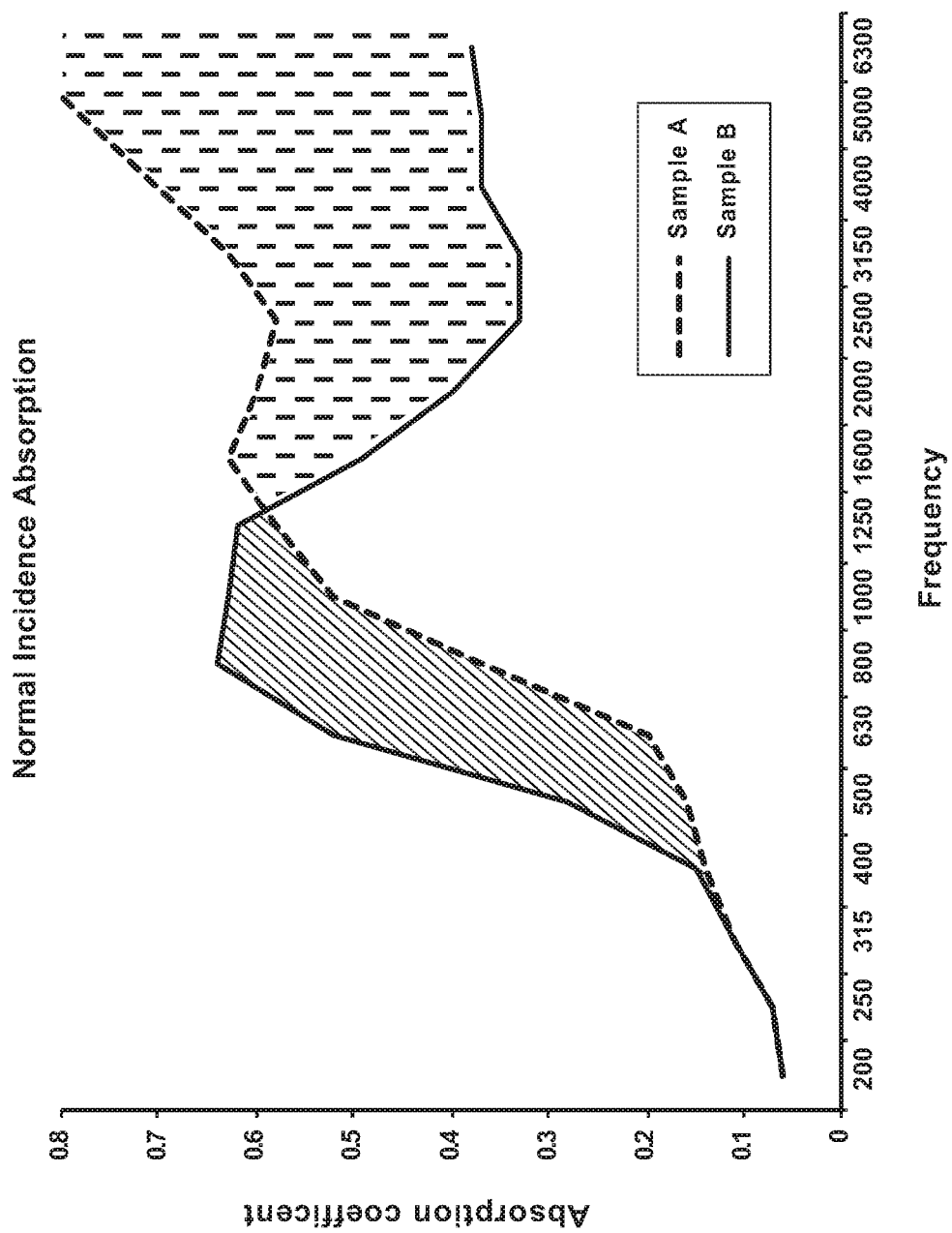
FIG. 9 is a graphical representation of the normal incidence absorption for an acoustic silencer according to the invention and a conventional dissipative silencer.

FIG. 9 is a graphical representation comparing the normal incidence absorption coefficient for Sample A and Sample B across a range of frequencies, as measured using ASTM E1050. The results show that Sample B, corresponding to the acoustic silencer 10, demonstrates better absorption at lower frequencies, for instance in the range of 630 to 1200 Hz. Particularly, in the frequency range of about 630 Hz to about 1600 Hz, the normal incidence absorption coefficient is shown to be at or above approximately 0.5, and peaks around 800 Hz to maximize the absorption for the low frequency range of primary interest for noise attenuation in motor vehicles. Sample B, corresponding to the acoustic silencer 10, has a lower absorption performance at frequencies above 1600 Hz when compared to the typical compression molded dual density fiber silencer.

Figure 10:
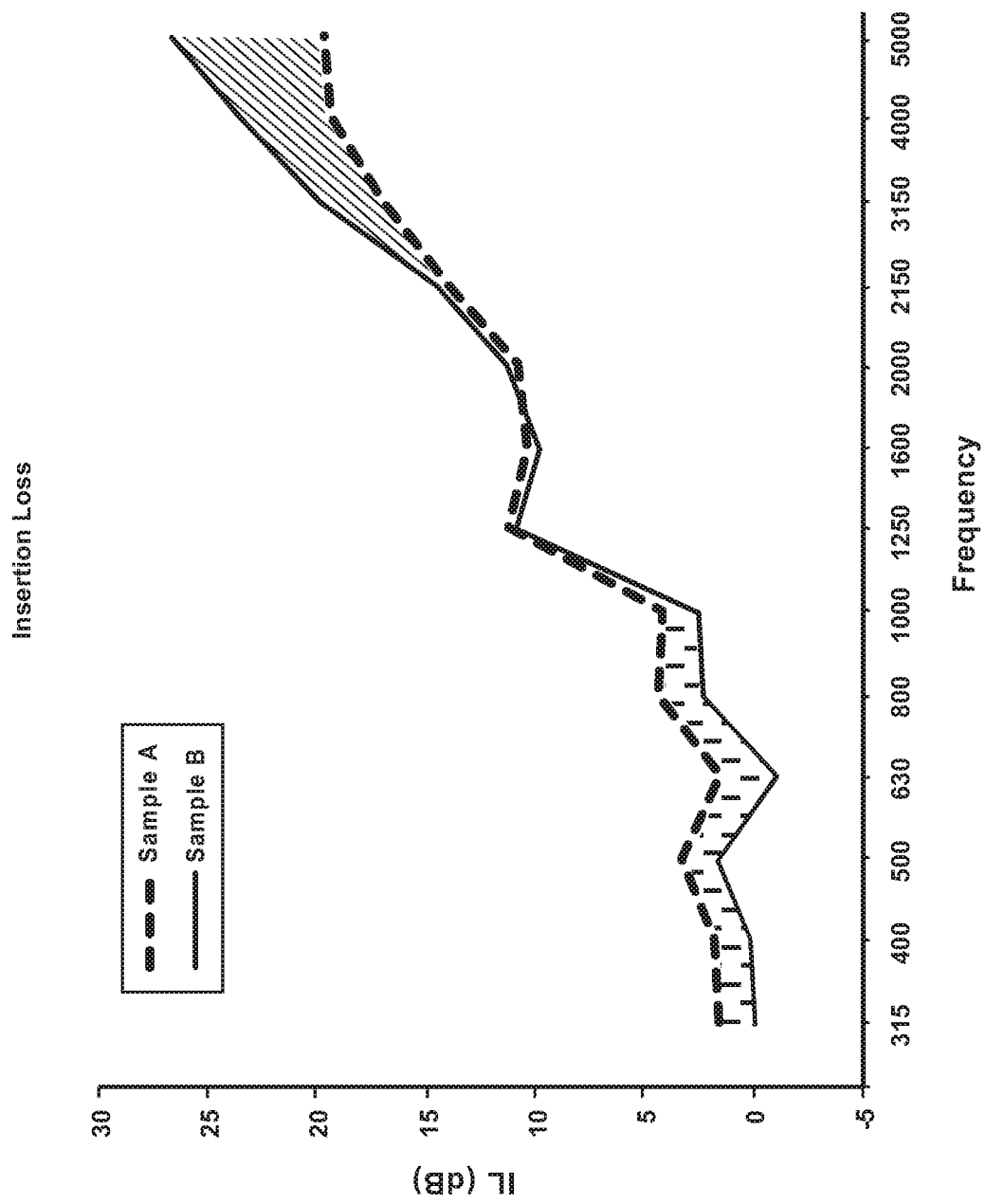
FIG. 10 is a graphical representation of the overall performance in flat panel insertion loss for an acoustic silencer according to the invention and a conventional dissipative silencer.

FIG. 10 is a graphical representation comparing the flat panel insertion loss for Sample A and Sample B across a range of frequencies. The insertion loss shown is the transmission loss of the system constituted by the sample part and a steel panel having a thickness of 0.9 mm on which it is applied minus the transmission loss of the steel panel itself. The results show that Sample B, corresponding to the acoustic silencer 10, demonstrates better insertion loss at higher frequencies, for instance above about 2000 Hz, and has a comparable insertion loss in the range of about 1600 Hz to about 2000 Hz. This combination of low frequency range absorption and high frequency range insertion loss results in Sample B, corresponding to the acoustic silencer 10, performing better overall across all frequencies.

Figure 11:
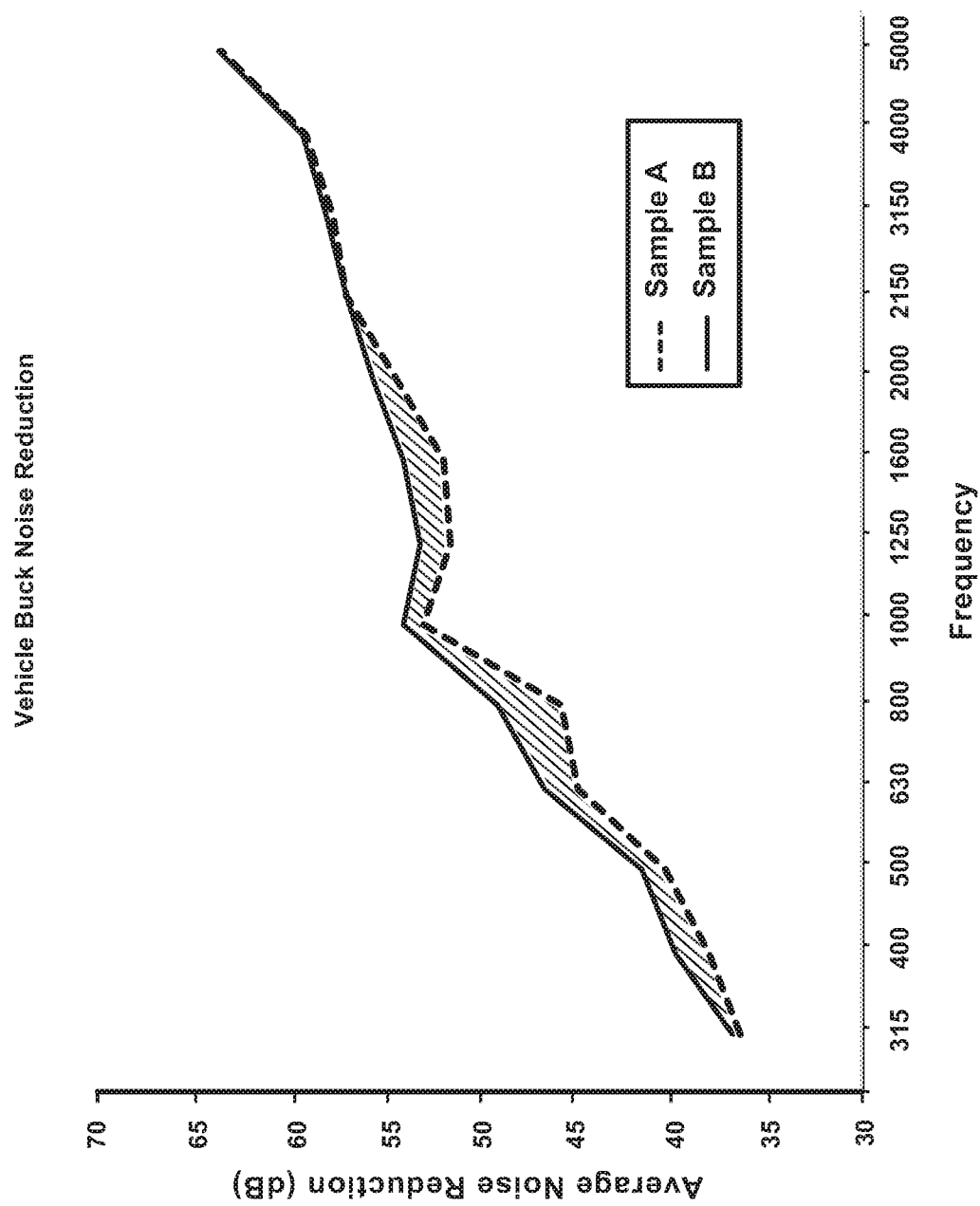
FIG. 11 is a graphical representation of the reduction in sound as a function of frequency for an acoustic silencer according to the invention and a conventional dissipative silencer, when assembled into the vehicle body with pass-through components in place.

FIG. 11 is a graphical representation comparing the overall noise reduction performance of Sample A and Sample B across a range of frequencies of primary interest for noise attenuation in motor vehicles. The vehicle buck test was performed on the samples installed over a conventional vehicle firewall. A cut-vehicle test sample was sealed between a reverberant chamber and an anechoic chamber, with the reverberant chamber positioned on the engine side of the cut-vehicle test sample and the anechoic chamber positioned on the passenger side of the cut-vehicle test sample. The cut-vehicle test sample included the firewall, dashboard, and all of the other components of the vehicle that pass through from the engine compartment assembled in place and including the carpet.

Two speakers in the reverberant chamber produced pink noise at 110 dB or better. One microphone was used to record the sound level in the reverberant chamber and three microphones were used to record the sound level in the anechoic chamber. With the speakers generating pink noise, the response, i.e. the sound level, of each microphone was measured. The average sound level recorded in the anechoic chamber was subtracted from the sound level recorded in the reverberant chamber in ⅓ octave frequency bands and represents the noise reduction due to the silencer. This difference is compared for Sample A and Sample B in FIG. 11. Sample B, corresponding to the acoustic silencer 10, performs better at vehicle noise reduction at all frequencies due to the tuning of absorption and insertion loss properties across the range of frequencies.

Figure 12:
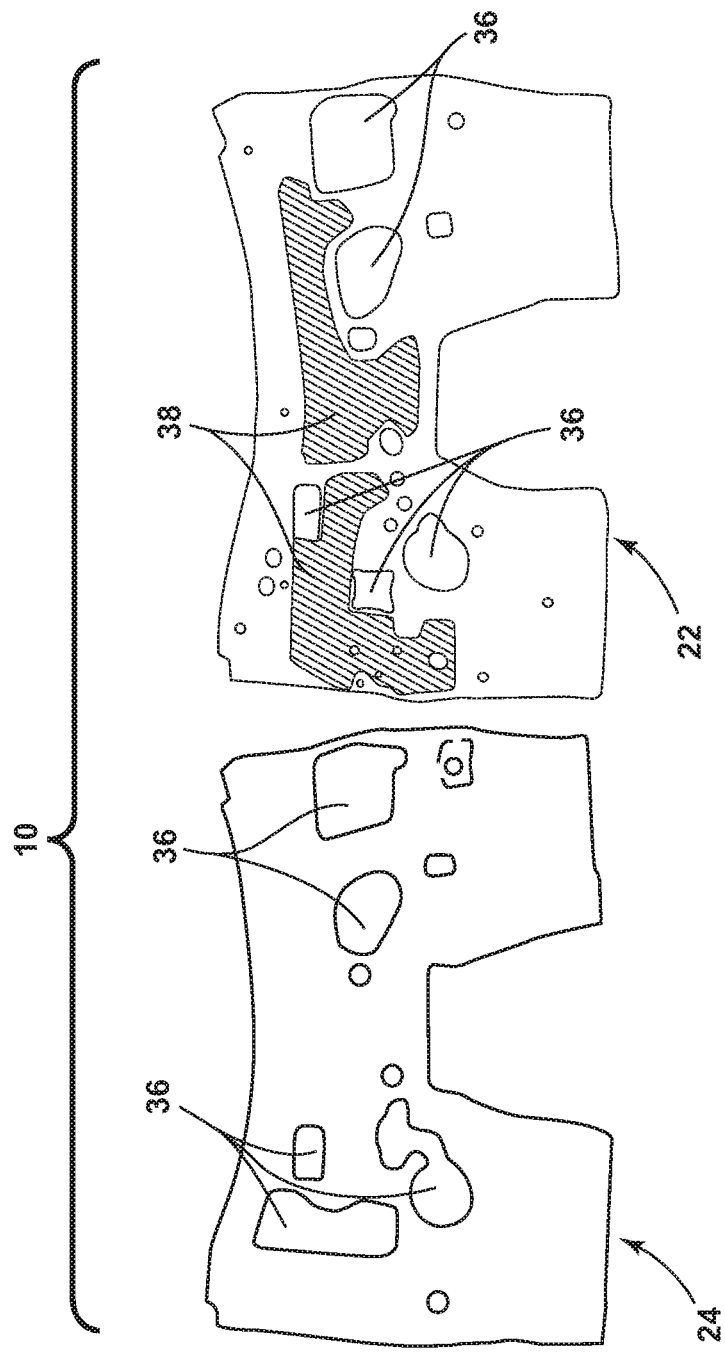
FIG. 12 is an exploded view of an acoustic silencer according to a second embodiment of the invention.

FIG. 12 is an exploded view of the acoustic silencer 10 according to a second embodiment of the invention. The acoustic silencer 10 can be substantially the same as the acoustic silencer 10 described above, and has added fiber layers 38 to increase the thickness of the acoustic silencer 10 locally where space allows in the front of dash assembly. Due to the variable nature of space within the front of dash, some areas can accommodate a thicker acoustic silencer, while other areas cannot. Adding fiber layers 38 in localized areas where additional material thickness can be accommodated can maximize noise attenuation of the acoustic silencer 10. The main layers 22, 24 are substantially coextensive with each other, while the additional layers 38 cover a smaller portion of either layer 22, 24, and can be placed where there is space for additional material thickness.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language that defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

Terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially," "about," and "approximately" are utilized herein to represent the inherent degree of uncertainty that may be attributed to any quantitative comparison, value, measurement, or other representation. The terms "substantially," "about," and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various inventions described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

The invention claimed is:

1. An acoustic silencer for a motor vehicle having a sound radiating surface, the acoustic silencer comprising:
    a first insertion loss layer configured to be adjacent to the sound radiating surface of the motor vehicle and comprising:
        a fiber decoupler layer having a surface density of about 0.6 to 1.3 kg/m$^2$; and
        a first airflow resistant scrim attached to the fiber decoupler layer, the first airflow resistant scrim having airflow resistance about 1200 to 8000 mks rayls, measured using ASTM C522; and
    a second absorption layer on the first insertion loss layer and configured to face outward from the sound radiating surface of the motor vehicle, and comprising:
        a fiber absorber layer on the first airflow resistant scrim, the fiber absorber layer having a surface density of about 0.3 to 0.5 kg/m$^2$; and
        a second airflow resistant scrim attached to the fiber absorber layer, the second airflow resistant scrim having an airflow resistance of about 100 to 3000 mks rayls, measured using ASTM C522;
        wherein the acoustic silencer has a normal incidence absorption coefficient, as measured using ASTM E1050, of at least approximately 0.5 in a frequency range of about 630 Hz to about 1600 Hz.

2. The acoustic silencer according to claim 1, wherein the thickness of the second absorption layer is about ⅓ to ⅕ of the thickness of the first insertion loss layer.

3. The acoustic silencer according to claim 1, wherein the second absorption layer has a thickness of about 5 mm, and the first insertion loss layer has a thickness of about 10-25 mm.

4. The acoustic silencer according to claim 1, wherein the first airflow resistant scrim has a thickness of about 0.1-1.0 mm and the second airflow resistant scrim has a thickness of about 0.1-1.0 mm.

5. The acoustic silencer according to claim 1, wherein the fiber decoupler layer has a thickness of about 10-20 mm.

6. The acoustic silencer according to claim 1, wherein the fiber decoupler layer has a thickness of about 10-20 mm, and the first airflow resistant scrim has a thickness of about 0.1-1.0 mm.

7. The acoustic silencer according to claim 1, wherein the fiber absorber layer has a density of about 33 to about 200 kg/m3.

8. The acoustic silencer according to claim 1, wherein the fiber absorber layer has a thickness of about 6 mm.

9. The acoustic silencer according to claim 1, wherein the fiber absorber layer has a thickness of about 6 mm, and the second airflow resistant scrim has a thickness of about 0.1-1.0 mm.

10. The acoustic silencer according to claim 9, wherein the fiber decoupler layer has a thickness of about 10-20 mm, and the first airflow resistant scrim has a thickness of about 0.1-1.0 mm.

11. The acoustic silencer according to claim 1, wherein the fiber decoupler layer and the fiber absorber layer comprise cotton shoddy.

12. The acoustic silencer according to claim 1, wherein the fiber decoupler layer comprises a cotton shoddy layer with a surface density of about 0.80 kg/m$^2$, the first airflow resistant scrim has an airflow resistance of about 3000 mks rayls measured using ASTM C522, the fiber absorber layer comprises a cotton shoddy layer with a surface density of about 0.40 kg/m², and the second airflow resistant scrim has an airflow resistance of about 800 mks rayls measured using ASTM C522.

13. The acoustic silencer according to claim 1, further comprising a frame, the second absorption layer secured to the frame, the frame providing structural support and shape to the first insertion loss and the second absorption layers.

14. The acoustic silencer according to claim 1, further comprising at least one additional fiber layer.

15. A motor vehicle acoustic silencer comprising:
   a first insertion loss layer comprising:
      a fiber decoupler layer having a surface density of about 0.6 to 1.3 kg/m²; and
      a first airflow resistant scrim attached directly to the fiber decoupler layer, the first airflow resistant scrim having airflow resistance about 1200 to 8000 mks rayls, measured using ASTM C522; and
   a second absorption layer on the first insertion loss layer and comprising:
      a fiber absorber layer on the first airflow resistant scrim, the fiber absorber layer having a surface density of about 0.3 to 0.5 kg/m²; and
      a second airflow resistant scrim attached directly to the fiber absorber layer, the second airflow resistant scrim having an airflow resistance of about 100 to 3000 mks rayls, measured using ASTM C522.

16. The motor vehicle acoustic silencer according to claim 15, wherein the first airflow resistant scrim has a thickness of about 0.1-1.0 mm, and the second airflow resistant scrim has a thickness of about 0.1-1.0 mm.

17. The motor vehicle acoustic silencer according to claim 15, wherein:
   the fiber decoupler layer has a thickness of about 10-20 mm;
   the first airflow resistant scrim has a thickness of about 0.1-1.0 mm;
   the fiber absorber layer has a thickness of about 6 mm; and
   the second airflow resistant scrim has a thickness of about 0.1-1.0 mm.

18. The motor vehicle acoustic silencer according to claim 15, wherein the fiber decoupler layer comprises a cotton shoddy layer with a surface density of about 0.80 kg/m², the first airflow resistant scrim has an airflow resistance of about 3000 mks rayls measured using ASTM C522, the fiber absorber layer comprises a cotton shoddy layer with a surface density of about 0.40 kg/m², and the second airflow resistant scrim has an airflow resistance of about 800 mks rayls measured using ASTM C522.

19. The motor vehicle acoustic silencer according to claim 15, wherein the acoustic silencer has a normal incidence absorption coefficient, as measured using ASTM E1050, of at least approximately 0.5 in a frequency range of about 630 Hz to about 1600 Hz.

\* \* \* \* \*